US009357449B2

(12) United States Patent
Suh et al.

(10) Patent No.: US 9,357,449 B2
(45) Date of Patent: May 31, 2016

(54) COMMUNICATION METHOD IN A MOBILE COMMUNICATION SYSTEM AND A SYSTEM THEREOF (75) Inventors: Kyung-Joo Suh, Seoul (KR); Kyeong-In Jeong, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 152 days.

(21) Appl. No.: 13/503,289

(22) PCT Filed: Oct. 27, 2010

(86) PCT No.: PCT/KR2010/007429
§ 371 (c)(1),
(2), (4) Date: Apr. 20, 2012

(87) PCT Pub. No.: WO2011/052994
PCT Pub. Date: May 5, 2011

(65) Prior Publication Data
US 2012/0214493 A1 Aug. 23, 2012

(30) Foreign Application Priority Data
Oct. 27, 2009 (KR) .................. 10-2009-0102462

(51) Int. Cl.
*H04W 40/20* (2009.01)
*H04W 36/00* (2009.01)
*H04W 60/00* (2009.01)

(52) U.S. Cl.
CPC .......... *H04W 36/0066* (2013.01); *H04W 60/00* (2013.01)

(58) Field of Classification Search
CPC ................. H04W 36/0066; H04W 60/00
USPC ............. 455/436–445; 370/331–338
See application file for complete search history.

(56) References Cited

U.S. PATENT DOCUMENTS

2008/0102896 A1* 5/2008 Wang et al. .............. 455/560
2010/0029283 A1 2/2010 Iwamura
2011/0176530 A1* 7/2011 Vikberg et al. ........... 370/338

FOREIGN PATENT DOCUMENTS

EP         2 046 085 A1    4/2009
KR    10-2009-0021046 A    2/2009
KR    10-2009-0107023 A   10/2009

OTHER PUBLICATIONS

3rd Generation Partnership Project; Technical Specification Group Services and System Aspects; General Packet Radio Service (GPRS) enhancements for Evolved Universal Terrestrial Radio Access Network (E-UTRAN) access (Release 9), 3GPP TS 23.401 V9.1.0 (Jun. 2006).*

*Primary Examiner* — Vladimir Magloire
*Assistant Examiner* — Erica Navar
(74) *Attorney, Agent, or Firm* — Jefferson IP Law, LLP (57) ABSTRACT

The present disclosure relates to a communication method between a terminal and a network during an inter PLMN (public land mobile network) handover in a mobile communication network that shares an E-UTRAN (evolved universal terrestrial radio access network), and a mobile communication system thereof. According to the present invention, the terminal performs E-UTRAN registration through a base station (eNB) and an MME (MME), updates a routing area, activates ISR (idle state signaling reduction), receives a handover command to the previous PLMN or another PLMN and transmits a location update request message to the MME while the handover is being executed. As such, a communication disconnect or any authentication or security failure during the inter PLMN handover of the terminal can be avoided.

24 Claims, 6 Drawing Sheets

COMMUNICATION METHOD IN A MOBILE COMMUNICATION SYSTEM AND A SYSTEM THEREOF

PRIORITY

This application is a National Stage application under 35 U.S.C.§371 of an International application filed on Oct. 27, 2010 and assigned application No. PCT/KR2010/007429, and claims the benefit under 35 U.S.C.§365(b) of a Korean Patent Application filed Oct. 27, 2009 in the Korean Intellectual Property Office and assigned application No. 10-2009-0102462, the entire disclosure of which is hereby incorporated by reference.

BACKGROUND OF THE INVENTION

1. Field of the Invention

The present invention relates to a mobile communication system, and more particularly to a method and a system for solving inconsistency in PLMN (Public Land Mobile Network)-related information between a user equipment and a network, which can occur in an environment where the user equipment hands over from an RAT (Radio Access Technology) area to an E-UTRAN (Evolved Universal Terrestrial Radio Access Network) area which has a different PLMN from that of the RAT area.

2. Description of the Related Art

3GPP ($3^{rd}$ Generation Partnership Project) which is representative of general mobile communication systems, defined an EPS (Evolved Packet System) and introduced an MME (Mobility Management Entity) as a mobile manager of a network, for the next generation communication. In addition to such a change in a communication core network (i.e. a change to an EPS), wireless access technology introduced an E-UTRAN. The mobile communication system as described above improved a Non-Access Stratum (NAS) protocol used in a conventional mobile communication system (particularly, 3G of 3GPP), and proposed an improvement method in order to provide high-speed communication services in the next generation mobile communication. Herein, in addition to a previously-performed authentication process and a security process performed in a wireless access layer, a security mode was performed by introducing a secured NAS protocol concept to a NAS layer. Accordingly, a security management method was strengthened. Also, in order to promote the efficiency of the wireless access technology, the wireless access technology was designed in such a manner as to avoid overhead in a wireless connection message even at an RRC (Radio Resource Control) side. Accordingly, a NAS protocol determines that when a user equipment hands over, information such as a PLMN identity is transmitted through tracking area update accept.

However, currently, according to the definition of the NAS protocol, the definition of ISR and the definition of a network sharing environment, in supporting handover between PLMNs, currently-defined procedures and messages can cause a problem such that communication may be cut off in an actual operation of the handover, or a problem of security. Accordingly, it is necessary to propose a method which continuously and efficiently performs authentication, the support of security and the support of communication between a user equipment and a network even in an environment, where a PLMN changes, through improvement in network sharing and an ISR handover process.

SUMMARY OF THE INVENTION

Accordingly, an aspect of the present invention is to solve the above-mentioned problems, and to provide a method and a system, in which, when support is provided to an AS corresponding to a second layer (layer 2) and a NAS protocol in evolved mobile communication systems including 3GPP EPS, ISR (Idle-state Signaling Reduction) is activated when a user equipment, which particularly hands over between PLMNs, is first attached to an E-UTRAN shared by many operators and then performs routing area update in another RAT, namely, a UTRAN (Universal Terrestrial Radio Access Network), a GERAN (GSM/EDGE Radio Access Network) or the like, and thereafter, when the user equipment hands over again to a tracking area of the previous E-UTRAN area, safe and efficient support is provided to security without cutting off communication, by transmitting a PLMN identity from a network to the user equipment.

Another aspect of the present invention is to provide a method, which clearly defines a handover operation between PLMNs in a network sharing environment and in an ISR environment by using a NAS protocol corresponding to a protocol between a user equipment and an MME, and prevents cut-off of communication between the user equipment and an entity acting as an MME, even when the user equipment moves from wireless access technology (i.e. UTRAN/GERAN corresponding to wireless access technology preceding 3GPP) other than 3GPP EPS, or from another access network to an E-UTRAN, as well as in 3GPP EPS.

In accordance with an aspect of the present invention, a method for communicating between a user equipment and a network during a handover between public land mobile networks (PLMNs) in a mobile communication network sharing an evolved universal terrestrial radio access network (E-UTRAN) is provided. The method includes: performing registration in a first PLMN through an evolved node base station (eNB) and a mobility management entity (MME), by a user equipment; moving to a second PLMN and performing a routing area update process and activating idle-state signaling reduction (ISR), by the user equipment; executing a handover to the first PLMN or a third PLMN, by the user equipment, and constructing a new tracking area identity (TAI) from a new PLMN identity and a tracking area code (TAC), by the user equipment; and transmitting a tracking area update request message including the TAI to the MME and receiving a response message, by the user equipment.

In accordance with another aspect of the present invention, a method for communicating between a user equipment and a network during a handover between public land mobile networks (PLMNs) in a mobile communication network sharing an evolved universal terrestrial radio access network (E-UTRAN) is provided. The method includes: performing registration of a user equipment in a first PLMN through an evolved node base station (eNB), by a mobility management entity (MME); executing a handover to the first PLMN or a third PLMN, by the user equipment, after moving to a second PLMN, performing a routing area update process and activating idle-state signaling reduction (ISR) of the user equipment, by the user equipment; receiving a tracking area update (TAU) request message including a new tracking area identity (TAI) constructed from a new PLMN identity and a tracking area code (TAC) from the user equipment, by the MME; and determining whether a TAU request of the user equipment is accepted, based on the TAI and transmitting a response message to the user equipment, by the MME.

In accordance with another aspect of the present invention, a mobile communication system for sharing an evolved universal terrestrial radio access network (E-UTRAN), and supporting communication between a user equipment and a network during a handover between public land mobile networks (PLMNs) is provided. The mobile communication system includes: a user equipment for moving from a first PLMN to a second PLMN, performing a routing area update process and executing a handover to the first PLMN or a third PLMN in a state of activating idle-state signaling reduction (ISR), before constructing a new tracking area identity (TAI) from a new PLMN identity and a tracking area code (TAC) and transmitting a tracking area update request message including the TAI; and a mobility management entity (MME) for receiving the tracking area update request message including the TAI from the user equipment, determining whether access of the user equipment is accepted, based on the TAI, and transmitting a response message to the tracking area update request message to the user equipment.

In accordance with another aspect of the present invention, a method for communicating between a user equipment and a network during a handover between public land mobile networks (PLMNs) in a mobile communication network sharing an evolved universal terrestrial radio access network (E-UTRAN) is provided. The method includes: performing registration in a first PLMN through an evolved node base station (eNB) and a mobility management entity (MME), by a user equipment; moving to a second PLMN and performing a routing area update process and activating idle-state signaling reduction (ISR), by the user equipment; executing a handover to the first PLMN or a third PLMN, by the user equipment; and transmitting a tracking area update request message including a new PLMN identity to the MME and receiving a response message, by the user equipment.

In accordance with another aspect of the present invention, a method for communicating between a user equipment and a network during a handover between public land mobile networks (PLMNs) in a mobile communication network sharing an evolved universal terrestrial radio access network (E-UTRAN) is provided. The method includes: performing registration of a user equipment in a first PLMN through an evolved node base station (eNB), by a mobility management entity (MME); executing a handover to the first PLMN or a second PLMN, by the user equipment, after moving to the second PLMN, performing a routing area update process and activating idle-state signaling reduction (ISR) of the user equipment, by the user equipment; receiving a tracking area update (TAU) request message including a new PLMN identity from the user equipment, by the MME; and determining whether a TAU request of the user equipment is accepted, based on a new tracking area identity (TAI) constructed from the new PLMN identity received from the user equipment and a tracking area code (TAC) and transmitting a response message to the user equipment, by the MME.

In accordance with another aspect of the present invention, a mobile communication system for sharing an evolved universal terrestrial radio access network (E-UTRAN), and supporting communication between a user equipment and a network during a handover between public land mobile networks (PLMNs) is provided. The mobile communication system includes: a user equipment for moving from a first PLMN to a second PLMN, performing a routing area update process and executing a handover to the first PLMN or a third PLMN in a state of activating idle-state signaling reduction (ISR), before transmitting a tracking area update (TAU) request message including a new PLMN identity; and a mobility management entity (MME) for receiving the tracking area update request message including the new PLMN identity from the user equipment, determining whether a TAU request of the user equipment is accepted, based on a tracking area identity (TAI) constructed from the new PLMN identity and a tracking area code (TAC), and transmitting a response message to the tracking area update request message to the user equipment.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION OF EXEMPLARY EMBODIMENTS OF THE PRESENT INVENTION

Hereinafter, an operational principle of exemplary embodiments of the present invention will be described with reference to the accompanying drawings. In the following description of the present invention, a detailed description of known functions and configurations incorporated herein will be omitted when it may make the subject matter of the present invention rather unclear. Also, terms described below, which are defined considering functions in the present invention, can be different depending on user and operator's intention or practice, etc. Therefore, the terms should be defined based on the disclosure throughout this specification.

A subject matter of the present invention which will be described below, is to provide a management method, in which support is provided so as to provide seamless communication to a mobile communication system and prevent the occurrence of a security problem, when a user equipment hands over between PLMNs in a state where a network is shared and ISR is activated by using a NAS protocol corresponding to a protocol between the user equipment and an MME, for the mobile communication system. Hereinafter, in describing the present invention in detail, a 3GPP EPS system, an E-UTRAN, a UTRAN, and a GERAN are described for illustrative purposes. However, the present invention is not limited to this configuration, and can also be used in another mobile communication system using NAS.

Also, the present invention proposes a method, which supports seamless communication during communication between a user equipment and an MME by using a NAS protocol, when the user equipment is first attached to an E-UTRAN and then hands over from another RAT (i.e. UTRAN/GERAN) to the E-UTRAN. This method can be slightly modified and the modified method can be applied to other mobile communication systems, which have similar background arts and channel forms or similar network architectures or similar protocols, or have protocols, which are different but similarly operate, without significantly departing from the scope of the present invention. This application can be determined by a person skilled in the technical field of the present invention.

Figure 1:
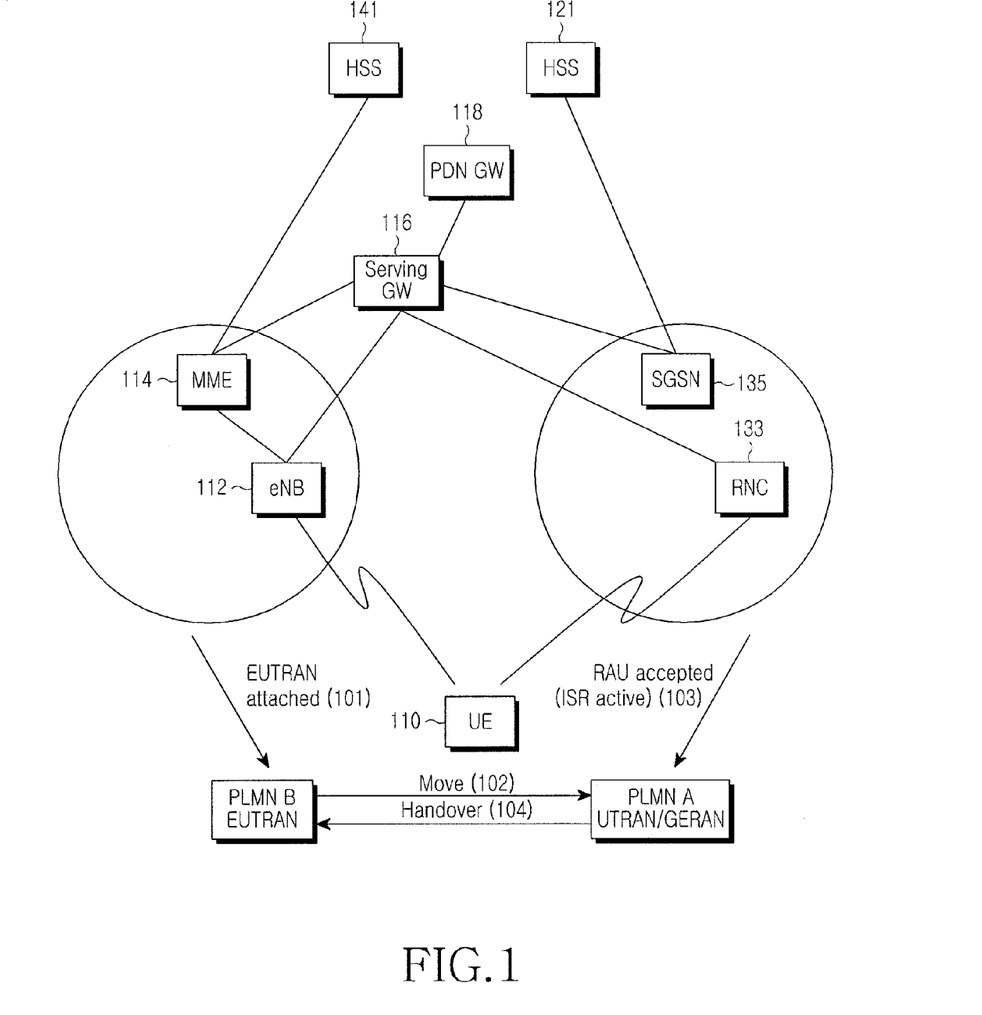
FIG. 1 is a block diagram illustrating a situation where a user equipment hands over between PLMNs in a mobile communication system environment where a network is shared and ISR is activated, according to an exemplary embodiment of the present invention.

FIG. 1 is a block diagram illustrating a situation where a user equipment hands over between PLMNs in a mobile communication system environment where a network is shared and ISR is activated, according to an exemplary embodiment of the present invention. In FIG. 1, the configuration of a 3GPP EPS system is shown as an example. In this specification, a description is made focusing on problems which can occur when a user equipment moves from another RAT (a UTRAN, a GERAN or the like) to an E-UTRAN. This method can also be applied to another similar mobile communication system.

Referring to FIG. 1, an Evolved Node Base Station (eNB) 112 sets a wireless connection between itself and a User Equipment (UE) 110 located in a cell corresponding to each service area, and performs communication with the UE 110. At this time, the mobility of the UE is managed by an MME 114. As described above, the UE 110 completes the attachment to a PLMN B area of an E-UTRAN in step 101 of E-UTRAN attached.

Then, in step 102, the UE 110 moves to a cell corresponding to a service area controlled by a Radio Network Controller (RNC) 133. In FIG. 1, a service area controlled by a UTRAN or a GERAN, is called a "PLMN A."

Meanwhile, in step 103, the UE performs tracking area update through a Routing Area Update (RAU) process in an area of the UTRAN or the GERAN. When the UE 110 performs the tracking area update as described above, a network may set ISR activation of the UE and then, the UE enters an ISR activation state. The UE 110 is connected to a packet data network, such as an Internet, through a Serving Gateway (Serving GW or SGW) 116. In this specification, a Packet Data Network Gateway (PDN GW) 118, which is an important network entity of a packet data network, acts as a Home Agent (HA).

Meanwhile, in order to manage the mobility of a UE, the location of a UE and registration, the MME 114 and a Serving GPRS Support Node (SGSN) 135 exist. Also, in order to manage authentication information and service information on users and UEs, Home Subscriber Servers (HSSs) 121 and 141 are connected to the MME 114/the SGSN 135 through interfaces of HSSs 121 and 141. Interfaces for managing a data path and the mobility of a UE exist between the RNC 133 and the serving GW 116, and between the SGSN 135 and the serving GW 116. In the present invention, the UE 110 and the MME 114/the SGSN 135 performs mobility management and session management by communicating with each other through a NAS protocol stack. Although the HSS 121 and the HSS 141 are separately shown in FIG. 1, the HSS 121 and the HSS 141 may operate in the form of being shared by themselves.

In the present invention, when ISR is activated as described above, the UE 110 may simultaneously receive pagings from another RAT (e.g. the UTRAN) and the E-UTRAN, even in an idle mode. Namely, the UE 110 is simultaneously registered in the MME 114 and the SGSN 135. Accordingly, the MME 114 and the SGSN 135 have a control connection to the serving GW 116.

The UE 110 stores a Mobility Management (MM) parameter from the SGSN 135 and an MM parameter from the MME 114, and stores session management information which is common in the E-UTRAN and the UTRAN/GERAN.

The present invention focuses on a situation where as in step 104, the UE 110 hands over while it considers another RAT (e.g. the UTRAN) as a source network and considers the E-UTRAN as a target network. When the UE 110 hands over as described above, it is assumed that source networks may have many different forms of RATs, such as the UTRAN, the GERAN and the like. Also, it is assumed that a PLMN of the source network is different from a PLMN of the target network to which the UE 110 subsequently moves. Namely, the present invention is intended to solve problems which can occur in a situation where the UE 110 hands over, when a PLMN changes from a PLMN A of the source network to a PLMN C, a PLMN B or the like of the target network, and when the target network supports the E-UTRAN.

Referring to FIG. 1, when the UE 110 hands over to the target network, the UE 110 is connected to the target eNB 112, the target MME 114 and the target HSS 141, and receives a service. Accordingly, the present invention proposes a method, by which the UE 110 and the MME 114 can efficiently operate based on a NAS protocol.

Figure 2:
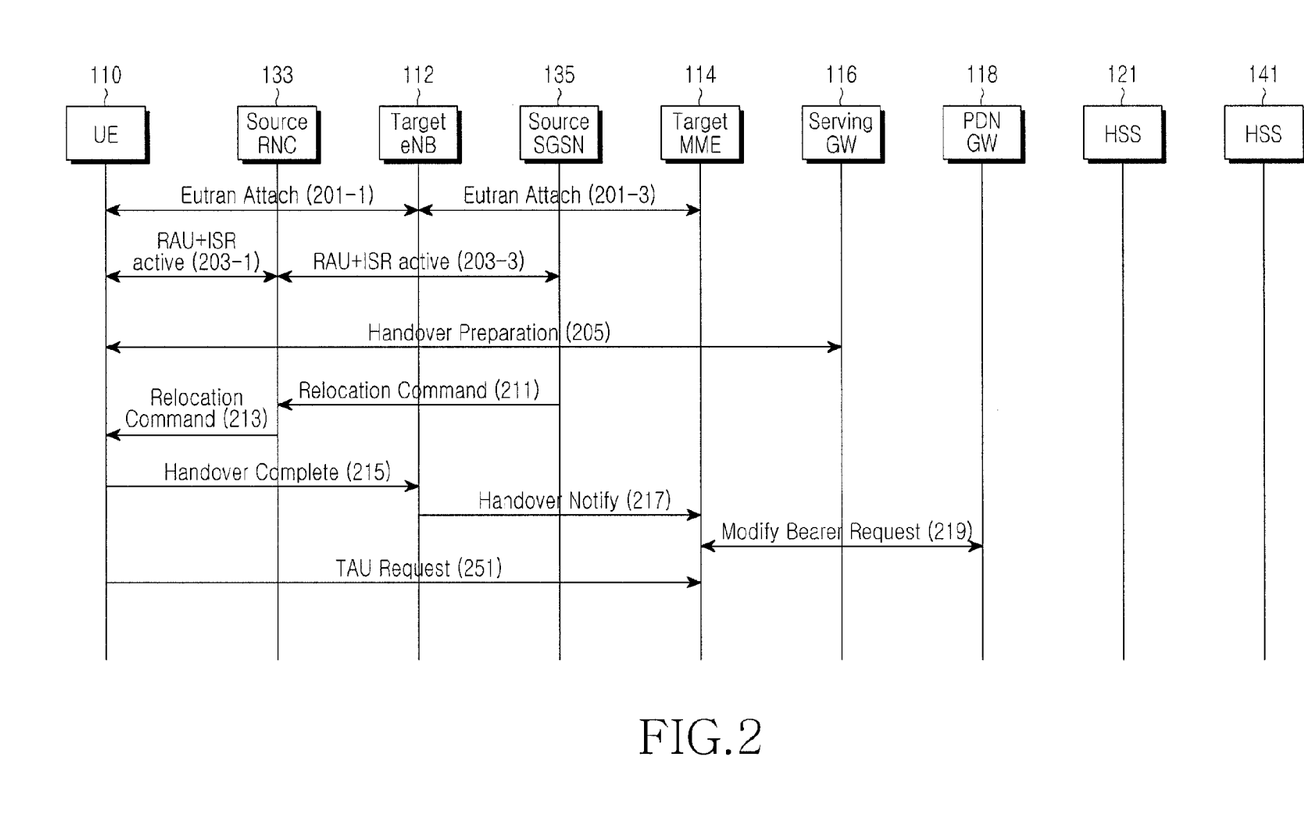
FIG. 2 is a message flow diagram illustrating a procedure of a handover process between PLMNs during E-UTRAN sharing and ISR activation, according to a first embodiment of the present invention.

FIG. 2 is a message flow diagram illustrating a procedure of a handover process between PLMNs during E-UTRAN sharing and ISR activation, according to a first embodiment of the present invention.

Referring to FIG. 2, in steps 201-1 and 201-3, the UE 110 is attached to an E-UTRAN. Steps 201-1 and 201-3 are steps in which the eNB 112 and the MME 114 are involved together. In the present invention, in order to express involved entities, step 201 is separately represented as step 201-1 and step 201-3. Then, in steps 203-1 and 203-3, the UE 110 moves to an area (e.g. UTRAN/GERAN) managed by another RAT. Accordingly, the UE 110 completes tracking area update, in which the SGSN 135 and the RNC 133 are involved, in a Routing Area Update (RAU) process. At this time, in order to activate an ISR state, the SGSN 135 sets and transmits the value of an information element on an update result of a routing area update accept message of the UE 110. Next, in step 205, the UE 110 prepares for handover from another RAT (e.g. the UTRAN) to the E-UTRAN. Namely, in step 205, the UE 110 sends a request for resources to a core network, and specifically, requests the target eNB 112, the target MME 114 and the serving GW 116 to prepare resources. At this request, a bearer context or a mobility management context are transmitted from a source network to a target network.

Important messages in the handover preparation process as described above are as follows. When the source RNC 133 sends a relocation required message to the source SGSN 135, the source SGSN 135 transmits a forward relocation request message to the target MME 114. Then, the target MME 114 transmits a forward relocation response message to the source SGSN 135.

Meanwhile, in step 211, the source SGSN 135 sends a relocation command message to the source RNC 133, and notifies the source RNC 133 of the completion of the handover preparation process. Then, in step 213, the source eNB/RNC 133 transmits a handover command message to the UE 110, and commands the UE 110 to hand over to the target eNB 112. When the UE 110 completes the handover to the target eNB 112 in step 215, the target eNB 112 transmits a handover notify message to the target MME 114, in step 217. Then, in step 219, the target MME 114, the serving GW 116, the PDN GW 118 and the like may be involved, and may perform a modify bearer request process.

Then, as in step 251, the UE 110 sends a Tracking Area Update (TAU) request message to the MME 114, during the process of executing the handover. Originally, it is usual that TAU is not executed after ISR is activated. However, even when the ISR is activated as in the present invention, in an environment where a network is shared (network sharing), after the UE hands over to the E-UTRAN, the TAU request is executed, and the MME 114 sends a tracking area update accept message including a PLMN identity to the UE 110. Accordingly, thereafter, the UE has a serving network identity of a serving network, which provides services to itself, as a PLMN identity, so that the UE can perform seamless communication.

Figure 3:
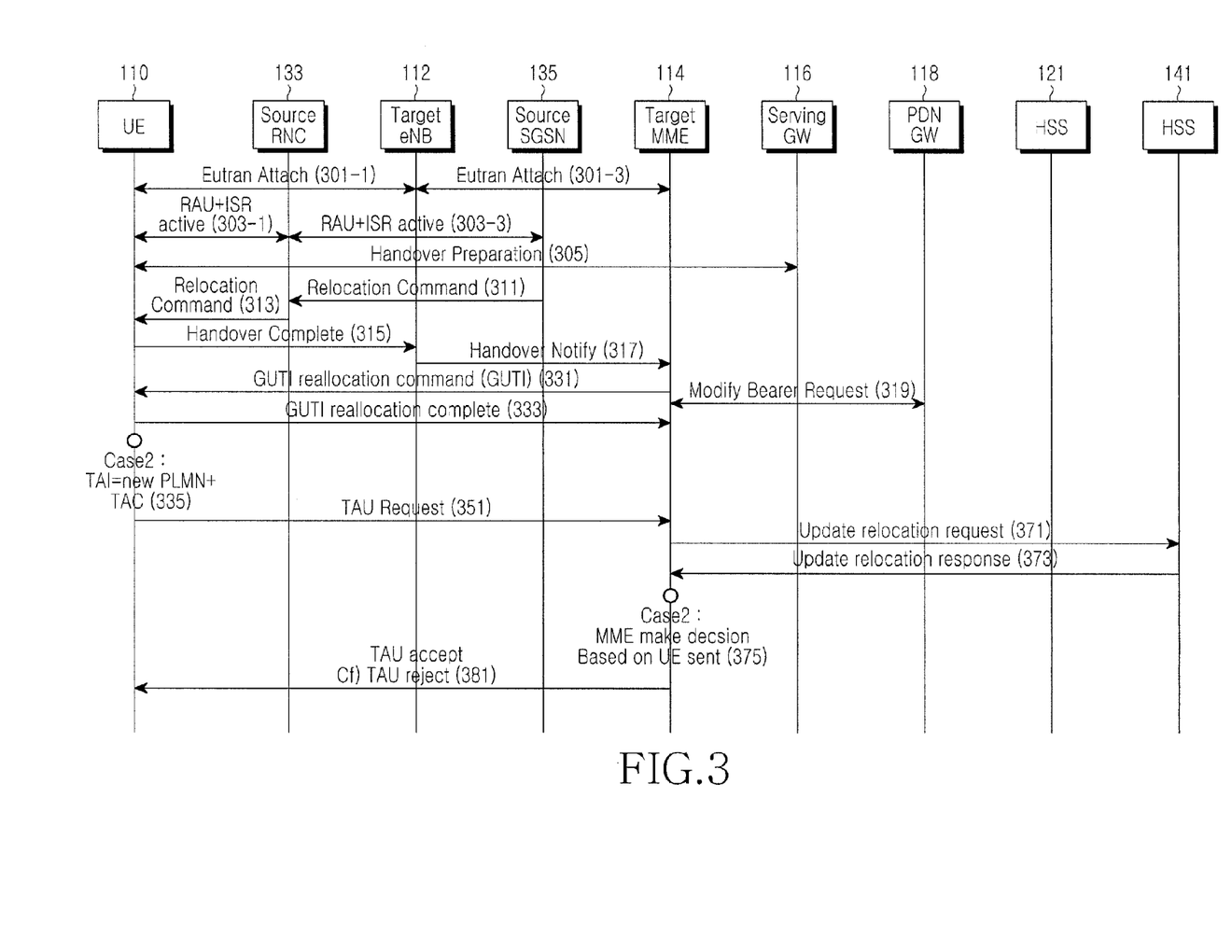
FIG. 3 is a message flow diagram illustrating a procedure of a handover process between PLMNs during E-UTRAN sharing and ISR activation, according to a second embodiment of the present invention.

FIG. 3 is a message flow diagram illustrating a procedure of a handover process between PLMNs during E-UTRAN sharing and ISR activation, according to a second embodiment of the present invention.

Referring to FIG. 3, in steps 301-1 and 301-3, the UE 110 is attached to an E-UTRAN, and the eNB 112 and the MME 114 are involved together therein. Then, in steps 303-1 and 303-3, the UE 110 moves to an area (e.g. UTRAN/GERAN) managed by another RAT. Accordingly, the UE 110 completes tracking area update, in which the SGSN 135 and the RNC 133 are involved, in a Routing Area Update (RAU) process. At this time, in order to activate an ISR state, the SGSN 135 sets and transmits the value of an information element on an update result of a routing area update accept message of the UE 110. Next, in step 305, the UE 110 performs a process of preparing for handover from another RAT (e.g. the UTRAN) to the E-UTRAN. Namely, in step 305, the UE 110 sends a request for resources to a core network, and specifically, requests the target eNB 112, the target MME 114 and the serving GW 116 to prepare resources. At this request, a bearer context or a mobility management context are transmitted from a source network to a target network.

Important messages in the handover preparation process as described above are as follows. When the source RNC 133 sends a relocation required message to the source SGSN 135, the source SGSN 135 transmits a forward relocation request message to the target MME 114. Then, the target MME 114 transmits a forward relocation response message to the source SGSN 135.

Meanwhile, in step 311, the source SGSN 135 sends a relocation command message to the source RNC 133, and notifies the source RNC 133 of the completion of the handover preparation process. Then, in step 313, the source eNB/RNC 133 transmits a handover command message to the UE 110, and commands the UE 110 to hand over to the target eNB 112. When the UE 110 completes the handover to the target eNB 112 in step 315, the target eNB 112 transmits a handover notify message to the target MME 114, in step 317. Then, in step 319, the target MME 114, the serving GW 116, the PDN GW 118 and the like may be involved, and may perform a modify bearer request process.

Meanwhile, after step 317, as in step 331, which may be arranged in parallel with step 319, or before or after step 319, the MME 114 may send a Globally Unique Temporary Identity (GUTI) reallocation command to the UE 110, and may allocate a new GUTI. Then, in step 333, the UE 110 responds to the MME 114 by sending a GUTI reallocation complete message to the MME 114. In steps 331 and 333 as described above, the UE 110 may know a PLMN identity of the area, in which the UE 110 has previously been registered and has performed tracking area update, through the GUTI which is newly allocated in the network (i.e. the E-UTRAN), to which the UE 110 has handed over and has moved.

Meanwhile, in step 335, the UE 110 constructs a Tracking Area Identity (TAI) from the PLMN identity, which has been newly allocated in steps 331 and 333, and a Tracking Area Code (TAC) included in broadcast system information.

Then, in step 351, the UE 110 sends a Tracking Area Update (TAU) request message including the TAI as constructed above, to the MME 114. In step 371, the MME 114 sends an update relocation request message to the HSS 141. In step 373, the HSS 141 transmits an update relocation response message to the MME 114. Thereafter, in step 375, the MME 114 determines whether a TAU request is accepted, based on the TAI which the UE 110 has sent in step 351. When the TAU request is accepted, the MME 114 sends a TAU accept message to the UE 110, in step 381.

Figure 4:
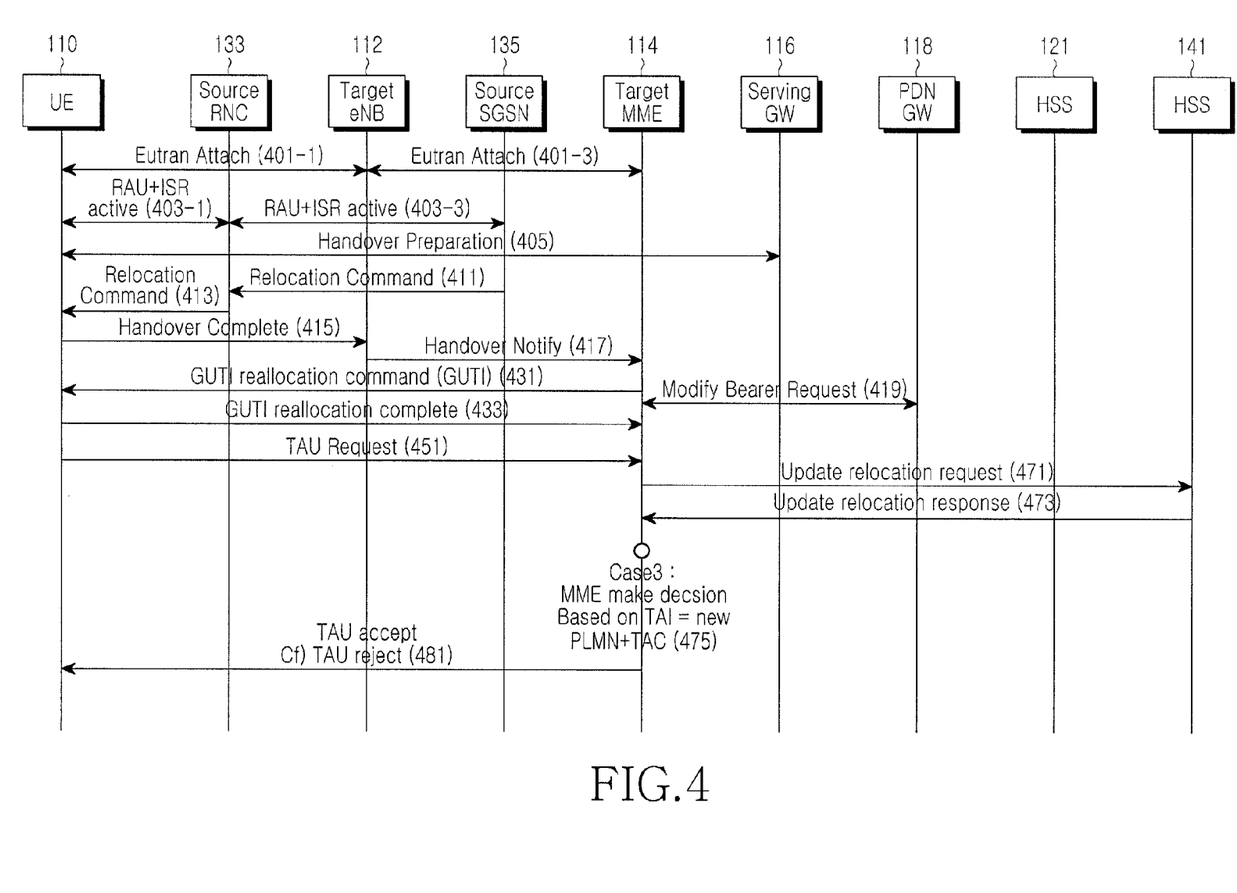
FIG. 4 is a message flow diagram illustrating a procedure of a handover process between PLMNs during E-UTRAN sharing and ISR activation, according to a third embodiment of the present invention.

FIG. 4 is a message flow diagram illustrating a procedure of a handover process between PLMNs during E-UTRAN sharing and ISR activation, according to a third embodiment of the present invention.

Referring to FIG. 4, in steps 401-1 and 401-3, the UE 110 is attached to an E-UTRAN, and the eNB 112 and the MME 114 are involved together therein. Then, in steps 403-1 and 403-3, the UE 110 moves to an area (e.g. UTRAN/GERAN) managed by another RAT. Accordingly, the UE 110 completes tracking area update, in which the SGSN 135 and the RNC 133 are involved, in a Routing Area Update (RAU) process. At this time, in order to activate an ISR state, the SGSN 135 sets and transmits the value of an information element on an update result of a routing area update accept message of the UE 110. Next, in step 405, the UE 110 performs a process of preparing for handover from another RAT (e.g. the UTRAN) to the E-UTRAN. Namely, in step 405, the UE 110 sends a request for resources to a core network, and specifically, requests the target eNB 112, the target MME 114 and the serving GW 116 to prepare resources. At this request, a bearer context or a mobility management context are transmitted from a source network to a target network.

Important messages in the handover preparation process as described above are as follows. When the source RNC 133 sends a relocation required message to the source SGSN 135, the source SGSN 135 transmits a forward relocation request message to the target MME 114. Then, the target MME 114 transmits a forward relocation response message to the source SGSN 135.

Meanwhile, in step 411, the source SGSN 135 sends a relocation command message to the source RNC 133, and notifies the source RNC 133 of the completion of the handover preparation process. Then, in step 413, the source eNB/RNC 133 transmits a handover command message to the UE 110, and commands the UE 110 to hand over to the target eNB 112. When the UE 110 completes the handover to the target eNB 112 in step 415, the target eNB 112 transmits a handover notify message to the target MME 114, in step 417. Then, in step 419, the target MME 114, the serving GW 116, the PDN GW 118 and the like may be involved, and may perform a modify bearer request process.

Meanwhile, after step 417, as in step 431, which may be arranged in parallel with step 419, or before or after step 419, the MME 114 may send a Globally Unique Temporary Identity (GUTI) reallocation command to the UE 110, and may allocate a new GUTI. Then, in step 433, the UE 110 responds to the MME 114 by sending a GUTI reallocation complete message to the MME 114. In steps 431 and 433 as described above, the UE 110 may know a PLMN identity of the area, in which the UE 110 has previously been registered and has performed tracking area update, through the GUTI which is newly allocated in the network (i.e. the E-UTRAN), to which the UE 110 has handed over and has moved. Then, in step 451, the UE 110 sends a Tracking Area Update (TAU) request message to the MME 114.

In step 471, the MME 114 sends an update relocation request message to the HSS 141. In step 473, the HSS 141 transmits an update relocation response message to the MME 114. Meanwhile, in step 475, the MME 114 determines access control (e.g. a tracking area or a PLMN of the UE 110) over the UE 110, based on a TAI constructed from PLMN identity information (i.e. a PLMN identity newly allocated to the UE 110) extracted from a GUTI included in the TAU request message, which the UE 110 has sent in step 451, and a TAC included in broadcast system information transmitted to the UE 110. The, in step 481, the MME 114 determines whether a TAU request is accepted, based on the TAI constructed in step 475. When the TAU request is accepted, the MME 114 sends a TAU accept message to the UE 110, in step 481.

Figure 5:
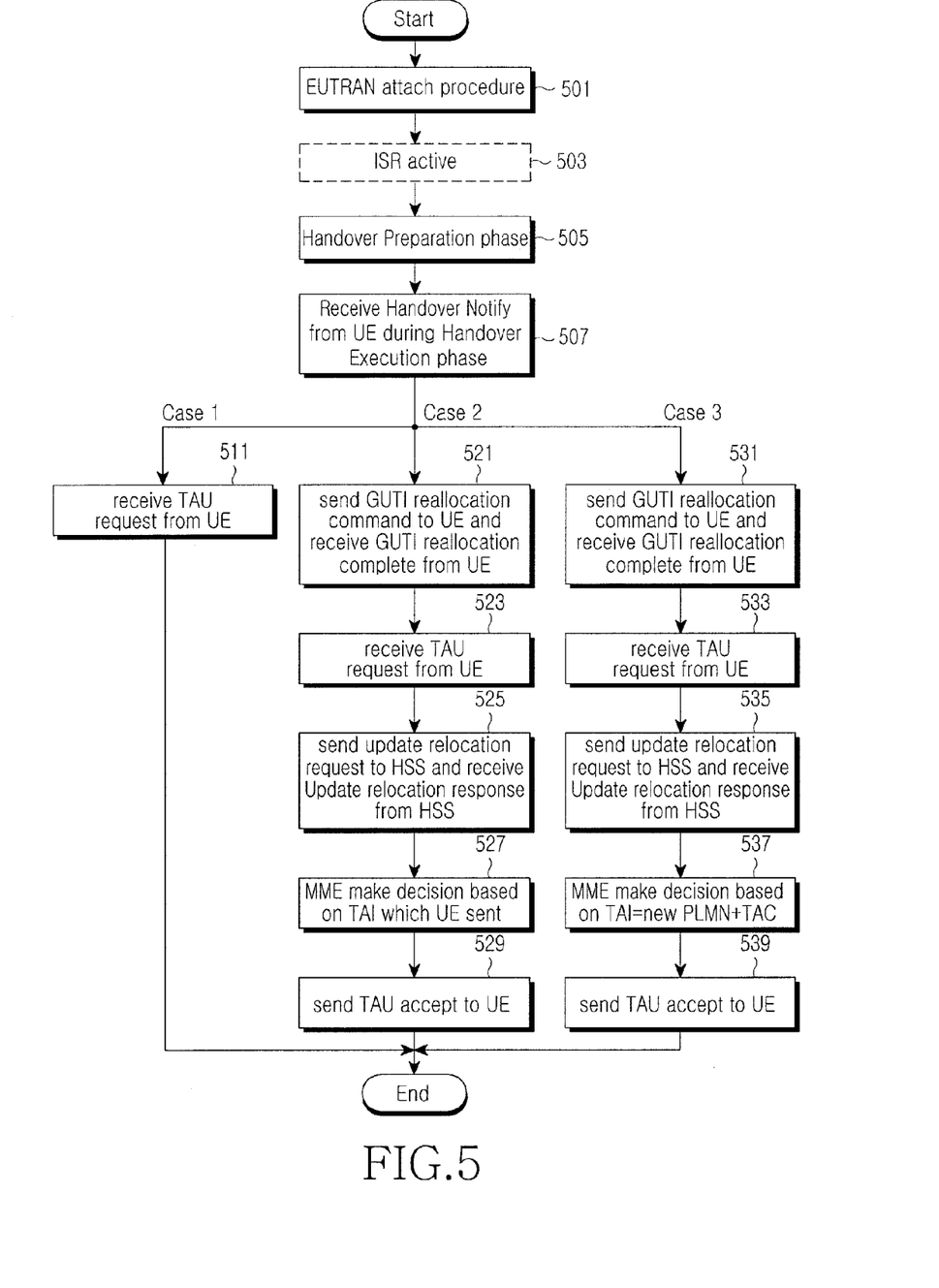
FIG. 5 is a flowchart illustrating the operation of an MME for supporting a procedure of a handover process between PLMNs during E-UTRAN sharing and ISR activation, according to an exemplary embodiment of the present invention.

FIG. 5 is a flowchart illustrating the operation of an MME for supporting a procedure of a handover process between PLMNs during E-UTRAN sharing and ISR activation, according to an exemplary embodiment of the present invention. In FIG. 5, a description is made of three operations that the MME 114 may perform according to first to third embodiments of the present invention. Hereinafter, a description will be made for each step.

In a first embodiment (case 1), the MME 114 performs, in step 501, an E-UTRAN attach procedure for the UE 110. Then, in step 503, when the UE 110 moves to an area (e.g. UTRAN/GERAN) and ISR is activated while the UE 110 performs an RAU process, the MME 114 involved in the E-UTRAN area also continues to maintain the registration of the UE 110. Then, in step 505, the MME 114 performs a handover preparation process for the UE 110. In step 507, the MME 114 performs a process until the MME 114 receives a handover notify message from the UE 110 during a handover process. Then, in step 511, the MME 114 receives a Tracking Area Update (TAU) request message from the UE 110.

Next, in a second embodiment (case 2), the MME 114 first performs steps 501 to 507, as in the first embodiment. Then, in step 521, the MME 114 sends a GUTI reallocation command message to the UE 110, and receives a GUTI reallocation complete message from the UE 110. In step 523, the MME 114 receives a TAU request message from the UE 110. In step 525, the MME 114 sends an update relocation request message to the HSS 141, and receives an update relocation response from the HSS 141, in response to the update relocation request message. In step 527, the MME 114 determines whether access of the UE 110 is accepted, based on a TAI of the TAU request message sent by the UE 110. Then, when the MME 114 determines that the access of the UE 110 is accepted, it sends a TAU accept message to the UE 110, in step 529.

Lastly, in a third embodiment (case 3), the MME 114 first performs steps 501 to 507 as in the first and second embodiments. In step 531, the MME 114 sends a GUTI reallocation command message to the UE 110, and receives a GUTI reallocation complete message from the UE 110. In step 533, the MME 114 receives a TAU request message from the UE 110. In step 535, the MME 114 sends an update relocation request message to the HSS 141, and receives an update relocation response from the HSS 141, in response to the update relocation request message. Then, in step 537, the MME 114 determines whether access of the UE 110 is accepted, based on a newly-allocated PLMN identity of the TAU request message sent by the UE 110 and a TAC. Then, when the MME 114 determines that the access of the UE 110 is accepted, it sends a TAU accept message to the UE 110, in step 539.

Figure 6:
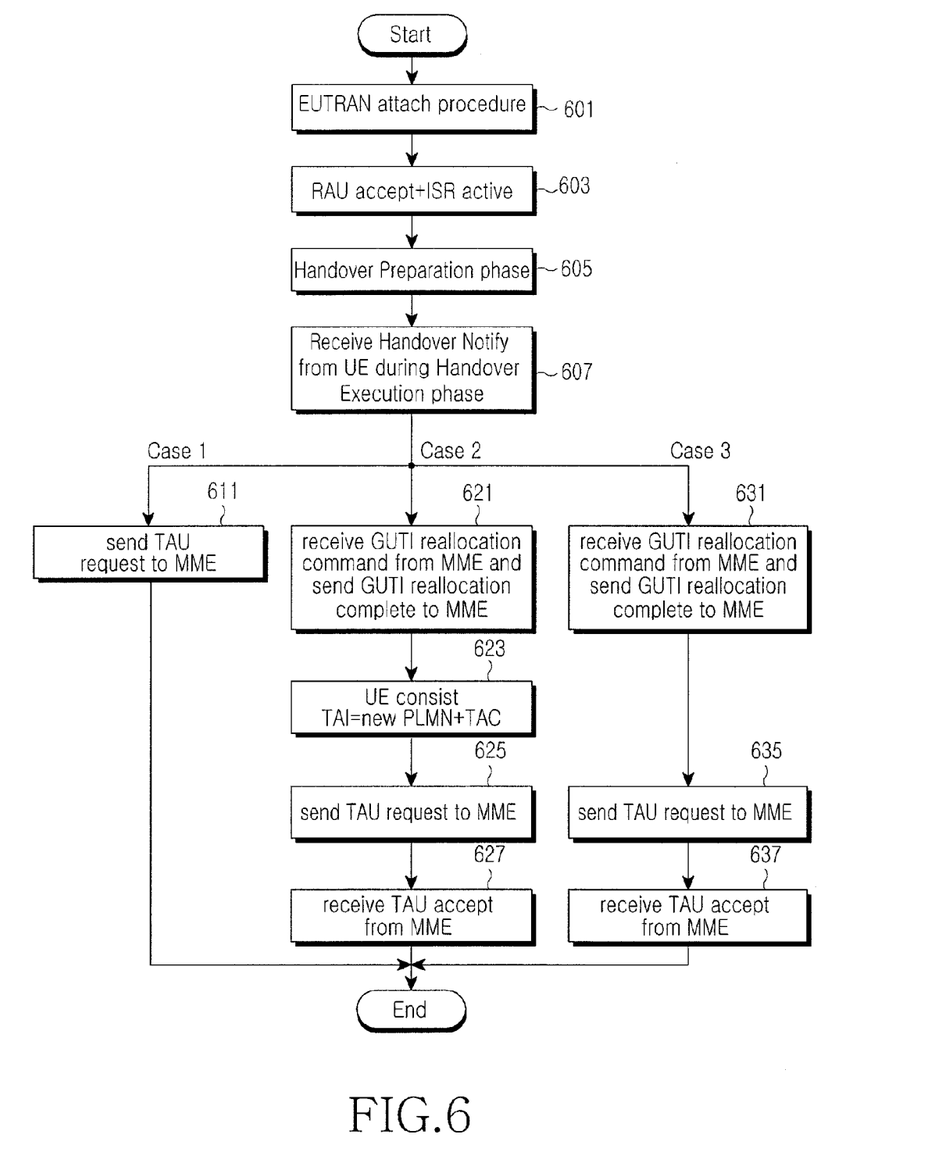
FIG. 6 is a flowchart illustrating the operation of a UE for supporting a procedure of a handover process between PLMNs during E-UTRAN sharing and ISR activation, according to an exemplary embodiment of the present invention.

FIG. 6 is a flowchart illustrating the operation of a UE for supporting a procedure of a handover process between PLMNs during E-UTRAN sharing and ISR activation, according to an exemplary embodiment of the present invention. In FIG. 6, a description is made of three operations that the UE 110 may perform according to first to third embodiments of the present invention. Hereinafter, a description will be made for each step.

In a first embodiment (case 1), the UE 110 performs, in step 601, an E-UTRAN attach procedure to an to the MME 114. Then, in step 603, when the UE 110 moves to an area (e.g. UTRAN/GERAN) and performs an RAU process before the UE 110 is approved and ISR is activated, the MME 114 which controls the E-UTRAN area, also continues to maintain the registration of the UE 110. Then, in step 605, the UE 110 performs a handover preparation process in which the MME 114 is involved. In step 607, the UE 110 performs a process until a handover notify message is delivered from the UE 110 to the MME 114 during a handover process. Then, in step 611, the UE 110 sends a Tracking Area Update (TAU) request message to the MME 114.

Next, in a second embodiment (case 2), the UE 110 first performs steps 601 to 607 as in the first embodiment. In step 621, the UE 110 receives a GUTI reallocation command from the MME 114, and sends a GUTI reallocation complete message to the MME 114, in response to the GUTI reallocation command. Then, in step 623, the UE 110 constructs a TAI from a newly-received PLMN identity and a TAC corresponding to one of broadcast system information. In step 625, the UE 110 sends a Tracking Area Update (TAU) request message to the MME 114. Thereafter, when access is accepted, the UE 110 receives a TAU accept message from the MME 114, in step 627.

Lastly, in a third embodiment (case 3), the UE 110 first performs steps 601 to step 607 as in the first and second embodiments. In step 631, the UE 110 receives a GUTI reallocation command from the MME 114, and sends a GUTI reallocation complete message to the MME 114, in response to the GUTI reallocation command. Then, in step 635, the UE 110 sends a Tracking Area Update (TAU) request message to the MME 114. When access is accepted, the UE 110 receives a TAU accept message from the MME 114, in step 637.

Hereinafter, effects obtained by representative embodiments of disclosed invention will be briefly described below.

According to the present invention, by a method for notifying a user equipment of a newly-selected PLMN identity when the user equipment hands over between PLMNs in a mobile communication network, when the user equipment is first attached to an E-UTRAN, moves to another RAT and performs routing area update, and then hands over from another RAT to an E-UTRAN area corresponding to a sharing network shared by many operators, solutions are proposed to problems, which occur in a case where the selection of a target cell of the E-UTRAN by a source RNC may cause a PLMN identity to become different from a PLMN identity known as a PLMN in which the user equipment is currently registered, although the user equipment intends to move to the previous tracking area. Accordingly, when the user equipment hands over between PLMNs, it is possible to prevent a phenomenon in which communication is cut off, or authentication or security assurance fails.

As a result, according to the present invention, when the user equipment hands over between PLMNs, after the user equipment is first attached to the E-UTRAN shared by many operators, and then moves to another RAT (e.g. UTRAN/GERAN) and ISR is activated, even while the user equipment hands over again from the UTRAN/GERAN to the previous E-UTRAN, problems caused by a change of a PLMN are solved, and the handover between PLMNs is successfully performed. Hence, it is possible to solve a problem of communication cut-off, or a problem of authentication, or a problem of security.

While the invention has been shown and described with reference to certain embodiments thereof, it will be understood by those skilled in the art that various changes in form and details can be made therein without departing from the spirit and scope of the invention. Therefore, the spirit and scope of the present invention is not limited to the described embodiments thereof, but is defined by the appended claims and equivalents thereof.

What is claimed is:

1. A method for performing a communication with a network by a user equipment (UE) in a mobile communication network, the method comprising:
    performing a routing area update process;
    determining whether a handover from a first public land mobile network (PLMN) to a second PLMN is completed and an idle state signaling reduction (ISR) function is activated at the UE; and
    based on the determination, transmitting a tracking area update (TAU) request message including a tracking area identity (TAI) to a target evolved node B (eNB), and receiving a TAU request response message including a TAU request result from the target eNB,
    wherein the TAI is constructed by the UE based on a PLMN identity of the second PLMN and a tracking area code (TAC), and
    wherein the PLMN identity is detected based on a globally unique temporary identity allocated by a mobility management entity (MME).

2. A method for controlling a communication between a user equipment (UE) and a network by a target evolved node B (eNB) in a mobile communication network, the method comprising:
    receiving a tracking area update (TAU) request message including a tracking area identity (TAI) which is constructed by the UE based on a public land mobile network (PLMN) identity of a second PLMN and a tracking area code (TAC) from the UE when an idle state signaling reduction (ISR) function is activated at the UE; and
    determining whether a TAU request of the UE is accepted based on the TAI, and
    transmitting a TAU request response message including a result of the determination to the UE,
    wherein the PLMN identity is detected based on a globally unique temporary identity allocated by a mobility management entity (MME).

3. The method as claimed in claim 2, further comprising transmitting an update relocation request message to a home subscriber server (HSS) and receiving an update relocation response message from the HSS, after receiving the TAU request message from the UE.

4. A method for performing a communication with a network by a user equipment (UE) in a mobile communication network, the method comprising:
    performing a routing area update process; and
    determining whether a handover from a first public land mobile network (PLMN) to a second PLMN is completed and an idle state signaling reduction (ISR) function is activated at the UE; and
    based on the determination, transmitting a tracking area update (TAU) request message including a PLMN identity of the second PLMN to a target evolved node B (eNB), and receiving a TAU request response message including a TAU request result from the target eNB,
    wherein the TAU request result is determined based on a tracking area identity (TAI) constructed by the UE from the PLMN identity of the second PLMN and a tracking area code (TAC), and
    wherein the PLMN identity is detected based on a globally unique temporary identity allocated by a mobility management entity (MME).

5. A method for controlling a communication between a user equipment (UE) and a network by a target evolved node B (eNB) in a mobile communication network, the method comprising:
    receiving a tracking area update (TAU) request message including a public land mobile network (PLMN) identity of a second PLMN from the UE when an idle state signaling reduction (ISR) function is activated at the UE;
    determining whether a TAU request of the UE is accepted based on a tracking area identity (TAI); and
    transmitting a TAU request response message including a result of the determination to the UE,
    wherein the TAI is constructed by the UE based on the PLMN identity of the second PLMN and a tracking area code (TAC), and
    wherein the PLMN identity is detected based on a globally unique temporary identity allocated by a mobility management entity (MME).

6. The method as claimed in claim 5, further comprising transmitting an update relocation request message to a home subscriber server (HSS) and receiving an update relocation response message from the HSS, after receiving the TAU request message from the UE.

7. A user equipment (UE) in a mobile communication network, the UE comprising:
    a controller configured to:
        perform a routing area update process,
        determine whether a handover from a first public land mobile network (PLMN) to a second PLMN is completed and an idle state signaling reduction (ISR) function is activated at the UE;
    a transmitter configured to transmit a tracking area update (TAU) request message including a tracking area identity (TAI) to a target evolved node B (eNB) based on the determination; and
    a receiver configured to receive a TAU request response message including a TAU request result from the target eNB,
    wherein the TAI is constructed by the UE based on a PLMN identity of the second PLMN and a tracking area code (TAC), and
    wherein the PLMN identity is detected based on a globally unique temporary identity allocated by a mobility management entity (MME).

8. A target evolved node B (eNB) in a mobile communication network, the target eNB comprising:
    a receiver configured to receive a tracking area update (TAU) request message including a tracking area identity (TAI) which is constructed by the UE based on a public land mobile network (PLMN) identity of a second PLMN and a tracking area code (TAC) from the UE when an idle state signaling reduction (ISR) function is activated at the UE;
    a controller configured to determine whether a TAU request of the UE is accepted based on the TAI; and a transmitter configured to transmit a TAU request response message including a result of the determination to the UE, wherein the PLMN identity is detected based on a globally unique temporary identity allocated by a mobility management entity (MME).

9. The target eNB as claimed in claim 8, wherein the transmitter transmits an update relocation request message to a home subscriber server (HSS) and the receiver receives an update relocation response message from the HSS, after receiving the TAU request message from the UE.

10. A user equipment (UE) in a mobile communication network, the UE comprising:
a controller configured to:
perform a routing area update process, and
determine whether a handover from a first public land mobile network (PLMN) to a second PLMN is completed and an idle state signaling reduction (ISR) function is activated at the UE;
a transmitter configured to transmit a tracking area update (TAU) request message including a PLMN identity of the second PLMN to a target evolved node B (eNB) based on the determination; and
a receiver configured to receive a TAU request response message including a TAU request result from the target eNB,
wherein the TAU request result is determined based on a tracking area identity (TAT) constructed by the UE from the PLMN identity of the second PLMN and a tracking area code (TAC), and
wherein the PLMN identity is detected based on a globally unique temporary identity allocated by a mobility management entity (MME).

11. A target evolved node B (eNB) in a mobile communication network, the target eNB comprising:
a receiver configured to receive a tracking area update (TAU) request message including a public land mobile network (PLMN) identity of a second PLMN from the UE when an idle state signaling reduction (ISR) function is activated at the UE;
a controller configured to determine whether a TAU request of the UE is accepted based on a tracking area identity (TAI); and
a transmitter configured to transmit a TAU request response message including a result of the determination to the UE,
wherein the TAI is constructed by the UE based on the PLMN identity of the second PLMN and a tracking area code (TAC), and wherein the PLMN identity is detected based on a globally unique temporary identity allocated by a mobility management entity (MME).

12. The target eNB as claimed in claim 11, wherein the transmitter transmits an update relocation request message to a home subscriber server (HSS) and the receiver receives an update relocation response message from the HSS, after receiving the TAU request message from the UE.

13. The method as claimed in claim 1, wherein the TAU request message is transmitted if idle-state signaling reduction (ISR) is activated by the routing area update process.

14. The method as claimed in claim 2, wherein the TAU request message is transmitted if idle-state signaling reduction (ISR) is activated by the routing area update process.

15. The method as claimed in claim 2, further comprising:
receiving a handover notification that a handover between the first PLMN and the second PLMN is completed.

16. The method as claimed in claim 4, wherein the TAU request message is transmitted if idle-state signaling reduction (ISR) is activated by the routing area update process.

17. The method as claimed in claim 5, wherein the TAU request message is transmitted if idle-state signaling reduction (ISR) is activated by the routing area update process.

18. The method as claimed in claim 5, further comprising:
receiving a handover notification that a handover between the first PLMN and the second PLMN is completed.

19. The UE as claimed in claim 7, wherein the TAU request message is transmitted if idle-state signaling reduction (ISR) is activated by the routing area update process.

20. The target eNB as claimed in claim 8, wherein the TAU request message is transmitted if idle-state signaling reduction (ISR) is activated by the routing area update process.

21. The target eNB as claimed in claim 8, wherein the receiver receives a handover notification that a handover between the first PLMN and the second PLMN is completed.

22. The UE as claimed in claim 10, wherein the TAU request message is transmitted if idle-state signaling reduction (ISR) is activated by the routing area update process.

23. The target eNB as claimed in claim 11, wherein the TAU request message is transmitted if idle-state signaling reduction (ISR) is activated by the routing area update process.

24. The target eNB as claimed in claim 11, wherein the receiver receives a handover notification that a handover between the first PLMN and the second PLMN is completed.

* * * * *